United States Patent [19]
Kim

[11] Patent Number: 5,614,068
[45] Date of Patent: Mar. 25, 1997

[54] WATER PURIFIER

[75] Inventor: Seung-Do Kim, Suwon, Rep. of Korea

[73] Assignee: Samsung Electronics CO., Ltd., Suwon, Rep. of Korea

[21] Appl. No.: 589,290

[22] Filed: Jan. 22, 1996

[30] Foreign Application Priority Data

Aug. 31, 1995 [KR] Rep. of Korea ............... 95-28359

[51] Int. Cl.[6] .................. C02F 1/461; C02F 1/32; C02F 1/02
[52] U.S. Cl. .................. 204/232; 204/241; 204/263; 204/290 F; 204/292; 204/239; 204/236; 210/180; 210/258; 210/252
[58] Field of Search .................. 204/232, 241, 204/263, 290 R, 290 F, 292, 236, 239; 210/180, 252, 258

[56] References Cited

U.S. PATENT DOCUMENTS

| | | | |
|---|---|---|---|
| 4,518,503 | 5/1985 | Fermaglich | 210/180 X |
| 4,834,874 | 5/1989 | Anthoney et al. | 210/180 X |
| 5,114,571 | 5/1992 | Pier et al. | 204/232 |
| 5,183,565 | 2/1993 | Zimmermann et al. | 204/232 X |
| 5,518,598 | 5/1996 | Yang | 204/241 X |

*Primary Examiner*—Donald R. Valentine
*Attorney, Agent, or Firm*—Burns, Doane, Swecker & Mathis, L.L.P.

[57] ABSTRACT

A water purifier removes harmful materials from tap water by electrochemical oxidation-reduction and distillation without using any filters. The water purifier has an electrochemical oxidation-reduction unit which removes heavy metals and organic materials from tap water by an electrochemical oxidation-reduction reaction, thus providing pre-purified water. A distillation unit heats the pre-purified water in order to vaporize the water while distilling off harmful materials. The vapor is discharged from the distillation unit and is condensed by a condenser while flowing in a vapor guide pipe, thus providing finally-purified water.

6 Claims, 2 Drawing Sheets

WATER PURIFIER

BACKGROUND OF THE INVENTION

1. Field of the Invention

The present invention relates in general to water purifiers used for removing various harmful materials from tap water such as city water thereby providing pure potable water.

2. Description of the Prior Art

Several types of water purifiers, which remove various harmful materials from tap water such as city water thereby providing pure potable water, have been proposed in the prior art.

FIG. 1 shows an example of typical water purifiers. As shown in the drawing, the typical water purifier includes a pre-processing filter 2 which removes various harmful organic materials such as chlorine from tap water supplied through a faucet 1. The above water purifier also includes a membrane 3 which removes various heavy metals, cancer-causing materials and bacteria from the water processed by the pre-processing filter 2. The water purifier further includes a post-processing filter 7 which removes odors such as poisonous gas from the water processed by the membrane 3.

The above water purifier is a reverse osmotic water purifier which purifies tap water using reverse osmotic pressure thereby providing pure water. However, the above water purifier has a problem in that filters such as the pre-processing filter, membrane and post-processing filter of the water purifier have to be replaced after the lapse of predetermined processing time.

In the prior art, natural-filtering type water purifiers, serial-filtering type water purifiers and ion exchange resin type water purifiers also have been proposed. However, the above water purifiers also use filters so they have the same problem in that the filters have to be replaced after the lapse of a predetermined processing time.

That is, in the typical water purifiers used for removing the harmful materials from tap water and providing pure potable water, the filters must be changed with new ones after the lapse of a predetermined processing time. The typical water purifiers are thus inconvenient to the users. Another problem of the above typical water purifiers is that if the filters are not replaced at the proper time, the operational reliability of the water purifiers will be reduced.

SUMMARY OF THE INVENTION

It is, therefore, an object of the present invention to provide a structurally improved water purifier in which the above problems can be overcome and which removes harmful materials from tap water without using any filters, thereby being convenient to the users and improving the operational reliability of the water purifier.

In order to accomplish the above object, the present invention provides a water purifier having an electrochemical oxidation-reduction units. That unit has an anode and cathode and removes heavy metals and organic materials from tap water by an electrochemical oxidation-reduction reaction, thereby providing pre-purified water. A pipe extends from the oxidation-reduction unit in order to guide the pre-purified water free from heavy metals and organic materials. A first water tank is connected to the above pipe and contains the pre-purified water discharged from the oxidation-reduction unit. A distillation unit is connected to the first water tank and heats the pre-purified water supplied from the first water tank, thus vaporizing the pre-purified water while distilling off various harmful materials of the pre-purified water. A vapor guide pipe extends from the distillation unit in order to guide the vapor discharged from the distillation unit. Condenser is provided on the vapor guide pipe and condenses the vapor flowing in the vapor guide pipe, thus providing finally-purified water. A second water tank is connected to the vapor guide pipe and contains the finallypurified water condensed by the condenser means.

The water purifier of this invention provides highly-purified water by removing heavy metals, organic materials and various harmful materials from tap water by electrochemical oxidation-reduction and distillation without using any filters. The present invention thus improves the operational reliability of the water purifier.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENT

Figure 1:
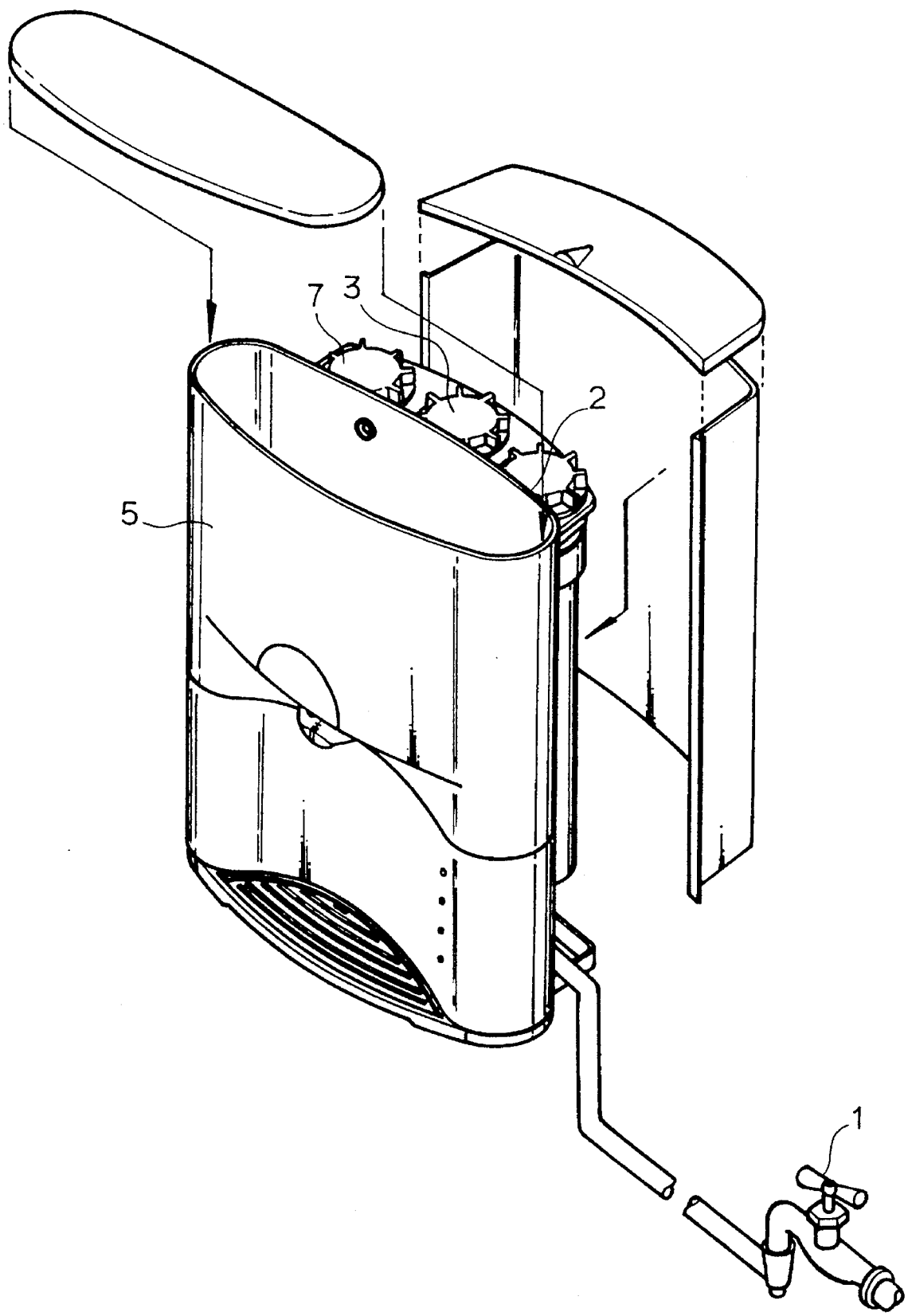
FIG. 1 is an exploded perspective view showing the construction of a typical conventional water purifier.
Figure 2:
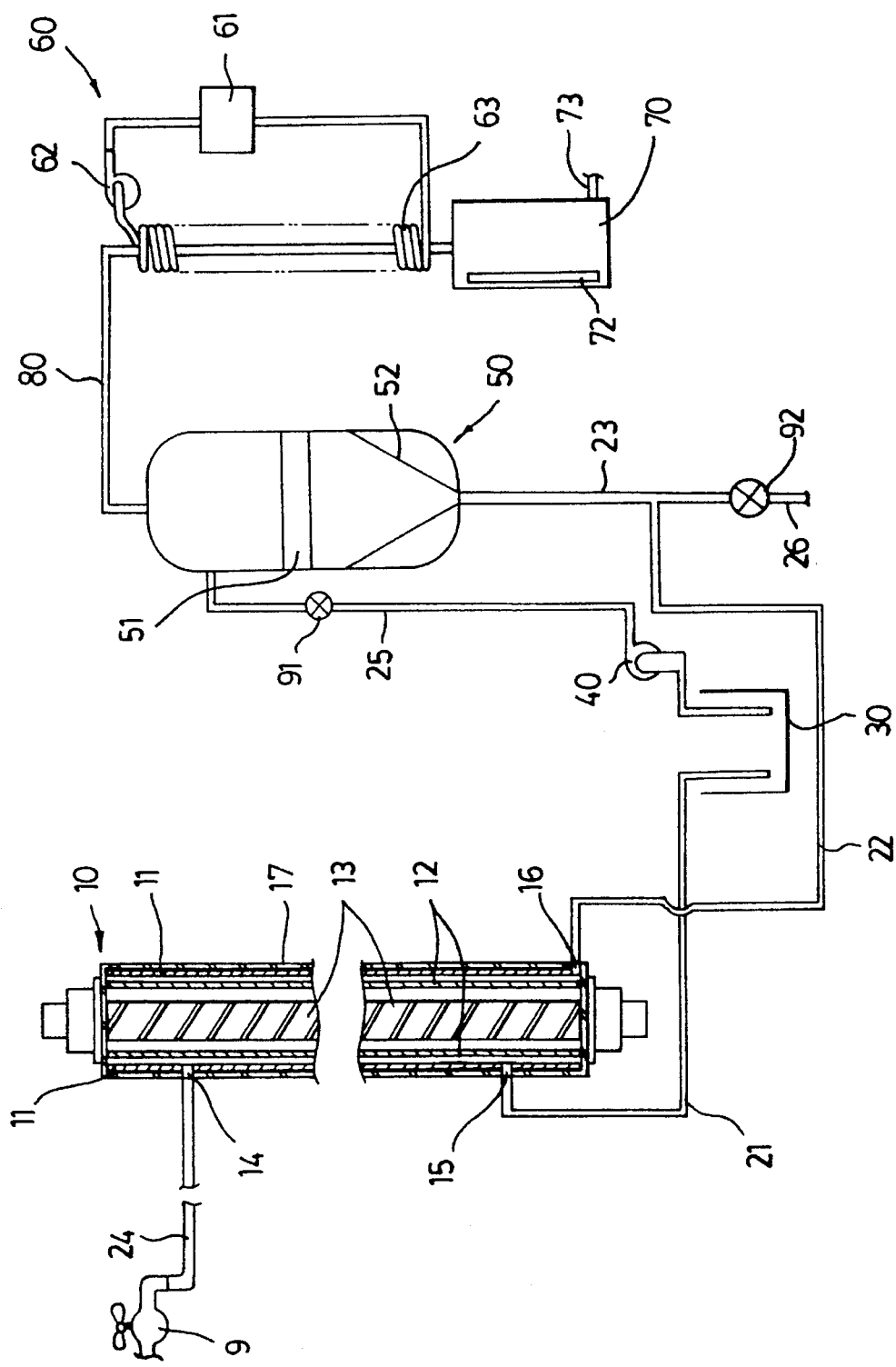
FIG. 2 is a view schematically showing the construction of a water purifier in accordance with a preferred embodiment of the present invention.

In the drawing, the reference numeral 10 denotes an electrochemical oxidation-reduction means which removes heavy metals and organic materials from tap water, such as city water supplied from a faucet 9, by an electrochemical oxidation-reduction reaction thus providing pre-purified water. The above electrochemical oxidation-reduction unit 10 includes a longitudinal hermetic casing 17 which is provided with a plurality of ports, that is, an anodic inlet port 14, an anodic outlet port 15 and a cathodic outlet port 16. In the unit 10, the tap water of the faucet 9 is introduced into the unit 10 through the anodic inlet port 14. The unit 10 processes the tap water in order to remove heavy metals and organic materials from the tap water, thus providing the pre-purified water. The above pre-purified water in turn is discharged from the means 10 through the anodic outlet port 15. On the other hand, the heavy metals and organic materials, which are removed from the tap water, are discharged from the means 10 through the cathodic outlet port 16.

In the electrochemical oxidation-reduction unit 10, an anode 11 is provided on the internal surface of the hermetic casing 17. The anode 11 is formed by coating ruthenium oxide ($RuO$) on titanium oxide ($TiO$) coated on the internal surface of the casing 17. The anode 11 separates oxygen from the tap water thereby promoting oxidation of the tap water 6. A cathode 13 axially extends in the center of the longitudinal casing 17. The cathode 13, which is constructed of iridium (Ir), promotes reduction of the tap water thereby separating heavy metals and organic materials from the tap water. A perforated partition 12 is arranged between the anode 11 and cathode 13. The above perforated partition 12 passes ionized or atomized materials, but intercepts molecular materials.

A first pipe 24 extends from the faucet 9 to the anodic inlet port 14 of the electrochemical oxidation-reduction unit 10. The first pipe 24 guides the tap water from the faucet 9 to the electrochemical oxidation-reduction unit 10.

After processing the tap water through the electrochemical oxidation-reduction reaction thereby removing the heavy metals and organic materials from the tap water and providing the pre-purified water, the means 10 discharges the pre-purified water through the anodic outlet port 15. In order to guide the pre-purified water discharged from the unit 10, a second pipe 21 extends from the anodic outlet port 15. On the other hand, a third pipe 22 extends from the cathodic outlet port 16 of the unit 10 in order to guide the heavy metals and organic materials, which are removed from the tap water and discharged from the unit 10 through the outlet port 16.

In the drawing, the reference numeral 30 denotes a first water tank which contains the pre-purified water supplied from the electrochemical oxidation-reduction unit 10. The second pipe 21 extends from the anodic outlet port 15 of the unit 10 to the first water tank 30.

The first water tank 30 is provided with a pumping means 40 which generates pumping force for forcibly feeding the pre-purified water of the tank 30 to a distillation means 50, which will be described in detail below.

The distillation means 50 heats the water fed from the first water tank 30 by the pumping force of the pumping means 40, thus vaporizing the water while distilling off various harmful materials of the water. That is, the distillation means 50 changes the pre-purified water into vapor free from harmful materials. In order to heat the pre-purified water fed from the tank 30, the distillation means 50 is provided with a heater 51.

That distillation means 50 also includes a funnel part 52 through which the harmful materials removed from the pre-purified water during the distillation are discharged from the means 50. The funnel part 52 has a predetermined tapered angle. A fourth pipe 23 extends from the discharging opening of the funnel part 52 in order to drain the harmful materials discharged from the distillation means 50. The third and fourth pipes 22 and 23 are commonly coupled to a sixth pipe 26.

That is, the third and fourth pipes 22 and 23 join the fifth pipe 26 so that the fifth pipe 26 drains the heavy metals and organic materials of the third pipe 22 and the harmful materials of the fourth pipe 23 to the outside.

The fifth pipe 26 is provided with a first checking means 92 which controls both the amount of heavy metals and organic materials discharged from the electrochemical oxidation-reduction means 10 and the amount of harmful materials discharged from the distillation means 50.

A vapor guide pipe 80 extends from the top of the distillation means 50. The vapor guide pipe 80 guides the vapor which was formed by distillation of the pre-purified water in the distillation means 50 and discharged from the means 50.

In order to guide the water which is forcibly supplied from the first water tank 30 to the distillation means 50 by the pumping force of the pumping means 40, a sixth pipe 25 extends from the pumping means 40 to the distillation means 50. The sixth pipe 25 is provided with a second checking means 91 which controls the amount of pre-purified water supplied from the tank 30 to the distillation means 50.

The water purifier of this invention also includes a condensing means 60 which cools the vapor flowing in the vapor guide pipe 80, thereby condensing the vapor and providing finally-purified water.

The condensing means 60 includes a means 61 for generating cooling water. The cooling water generated by the means 61 cools the vapor flowing in the vapor guide pipe 80 thus condensing the vapor and providing the finally-purified water. The condensing means 60 also includes a pump 62 which generates pumping force in order to forcibly circulate the cooling water generated by the cooling water generating means 61. The condensing means 60 further includes a condensing pipe 63. The condensing pipe 63 surrounds the vapor guide pipe 80 and guides the cooling water in order to condense the vapor flowing in the vapor guide pipe 80.

The vapor guide pipe 80 extends to a second water tank 70 which contains the finally-purified water condensed by the condensing means 60. The above second water tank 70 is provided with an ultraviolet lamp 72 for sterilizing the finally-purified water contained in the second water tank 70, thus removing bacteria such as microorganisms from the finally-purified water. The ultraviolet lamp 72 emits ultraviolet rays having a wavelength of 185 nm.

The second water tank 70 is provided with a water discharging port 73 which discharges the finally-purified water, sterilized by the ultraviolet lamp 72, from the tank 70.

The operation of the above water purifier will be described hereinbelow.

When opening the faucet 9, tap water flows in the first pipe 24 thereby being introduced into the electrochemical oxidation-reduction unit 10 through the anodic inlet port 14.

In the above oxidation-reduction unit 10, the tap water is processed by the electrochemical oxidation-reduction reaction. Heavy metals and organic materials are thus separated from the tap water and move to the cathode 13.

That is, the tap water is electrochemically reacted in the oxidation-reduction unit 10 thus being divided into ions as represented by the following formula.

$$H_2O \rightarrow H^+ + OH^-$$

At the anode 11 of the oxidation-reduction means 10, the electron "e" is removed from the hydroxide ion $OH^-$, so that the hydroxide ion is oxidized into free radical OH. Meanwhile, the hydrogen ion $H^+$ receives the electron at the cathode 13 thus being reduced into free radical H. The above oxidation of $OH^-$ and reduction of $H^+$ are represented by the following formulas.

$$OH^- - e \rightarrow OH$$

$$H^+ + e \rightarrow H$$

The free radical OH and free radical H generated from the above oxidation-reduction reaction in turn pass through the perforated partition 12 of the unit 10 in order to be reacted together, thus generating the following highly-activated reaction products.

$$H_2, H_2O, HO_2, H_2O_2, H^+, HO_2^-, OH^-, HO_2^-, OH_2^{2-}, O_2^-$$

$$H + H \rightarrow H_2$$

$$H_2O_2 + OH \rightarrow HO_2 + H_2O$$

$$H + H_2O \rightarrow OH + H_2$$

$$H_2O_2 + H^+ \rightleftharpoons HO_2^-$$

$$OH + OH \rightarrow HO_2 + H_2O$$

At the anode 11 of the oxidation-reduction unit 10, oxygen is separated from the tap water thus oxidizing the tap water as represented by the following formulas.

$$2H_2O - 4e \rightarrow H^+ + O_2$$

$2H_2O-3e \rightarrow HO_2+3H^+$ $2H_2O-2e \rightarrow H_2O_2+2H^+$ $H_2O-e \rightarrow HO_2+H^+$ The above products are reacted by the following serial recombination reactions thus producing reaction intermediates having high reaction power.

$OH+OH \rightarrow H_2O_2$ $H_2O_2+OH \rightarrow HO_2+H_2O$ $H_2O+HO_2 \rightarrow H_2O+OH+O_2$ $H_2O+H \rightarrow H_2O_2$ $O+O \rightarrow O_2$ $H_2O \leftrightarrows H^+ + O_2^-$ $H_2O+HO_2 \rightarrow H_2O+O_3+H$ $OH+OH \rightarrow H_2O_2$ The above reaction intermediates having high reaction power remain at the anode 11 for 10 minutes to several hours and have lower pH (pH 2–pH 4) and high oxidation-reduction electric potential (800–1200 mV).

During the above electrochemical oxidation-reduction reaction of the unit 10, the cathode 13 of the unit 10 will produce NaOH, KOH, Ca(OH)$_2$, Mg(OH)$_2$ and etc. when the tap water contains heavy metals and organic materials.

That is, when the tap water is introduced into the oxidation-reduction unit 10, the heavy metals and organic materials contained in the tap water move to the cathode 13 by the electrochemical oxidation-reduction reaction, while pre-purified water free from heavy metals and organic materials remains at the anode 11.

After the electrochemical oxidation-reduction reaction of the above unit 10, the heavy metals and organic materials produced by the cathode 13 are discharged from the unit 10 through the cathodic outlet port 16 and in turn are drained through the third and fifth pipes 22 and 26. On the other hand, the pre-purified water, which is produced by the anode 11 and free from heavy metals and organic materials, is discharged from the unit 10 through the anodic outlet port 15 and in turn is supplied to the first water tank 30 through the second pipe 21.

The pre-purified water of the tank 30 in turn is pumped by the pumping means 40 in order to be fed to the distillation means 50 through the sixth pipe 25.

In the above distillation means 50, the pre-purified water is heated by the heater 51 thereby being vaporized into vapor.

When the pre-purified water fed to the distillation means 50 contains harmful materials, the harmful materials are separated from the water during the distillation process and are deposited in the lower section of the means 50. Meanwhile, pure vapor free from harmful materials is discharged from the top of the means 50 through the vapor guide pipe 80.

The harmful materials removed from the pre-purified water during the distillation process of the distillation means 50 are discharged from the means 50 through the funnel part 52 of the means 50. The harmful materials in turn are guided by the fourth and fifth pipes 23 and 26 thus being drained.

On the other hand, the pure vapor free from harmful materials flow in the vapor guide pipe 80 while being cooled by the cooling water circulating in the condensing pipe 63 of the condensing means 60. The pure vapor flowing in the vapor guide pipe 80 is thus condensed into finally-purified water.

That is, the cooling water, which is produced by the cooling water generating means 61 of the condensing means 60 and forcibly circulated in the condensing pipe 63 by the pumping force of the pump 62, cools the vapor flowing in the vapor guide pipe 80 thereby condensing the vapor into the finally-purified water free from harmful materials.

As the vapor guide pipe 80 extends to the second water tank 70, the condensed purified water of the above pipe 80 is introduced into the second water tank 70.

The finally-purified water collected in the second water tank 70 contains bacteria such as microorganisms. However, as the second water tank 70 is provided with the ultraviolet lamp 72, the finally-purified water in the tank 70 is sterilized by the ultraviolet rays having a wavelength of 185 nm emitted from the lamp 72.

Briefly, the tap water supplied from the faucet 9 is introduced into the electrochemical oxidation-reduction unit 10 where the tap water is reacted by the electrochemical oxidation-reduction reaction. The unit 10 separates and removes heavy metals and organic materials from the tap water, thereby providing pre-purified water. The pre-purified water in turn is fed to the distillation means 50 where the pre-purified water is heated by the heater thereby being vaporized. In the distillation means 50, various harmful materials are removed from the purified water while the purified water is vaporized. The pure vapor free from the harmful materials in turn is discharged from the distillation means 50 to the second water tank 70 through the vapor guide pipe 80. The above pure vapor is cooled by the condensing means 60 while flowing in the vapor guide pipe 80, thus being condensed into finally-purified water. The finally-purified water is collected by the second water tank 70. The above finally-purified water in the tank 70 in turn is sterilized by the ultraviolet rays having the wavelength of 185 nm which are emitted from the ultraviolet lamp 72 of the tank 70. The water purifier of the invention thus provides highly-purified water.

As described above, the present invention provides a structurally improved water purifier which provides highly-purified water through electrochemical oxidation-reduction and distillation without using any filters differently from typical water purifiers. The present invention thus improves the operational reliability of the water purifiers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A water purifier comprising:

an oxidation-reduction unit having an anode and a cathode for removing heavy metals and organic materials from tap water by an electrochemical oxidation-reduction reaction, thereby providing pre-purified water;

a pipe extending from said oxidation-reduction unit for guiding the pre-purified water free of heavy metals and organic materials discharged from said oxidation-reduction unit;

a first water tank connected to said pipe for containing the pre-purified water discharged from said oxidation-reduction means;

a distillation unit connected to said first water tank for heating the pre-purified water supplied from said first water tank, thereby vaporizing the pre-purified water into vapor while distilling off various harmful materials of the pre-purified water;

a vapor guide pipe extending from said distillation unit for guiding the vapor discharged from the distillation means;

a condensing unit provided on said vapor guide pipe for condensing the vapor flowing in the vapor guide pipe, thereby providing finally-purified water; and a second water tank connected to said vapor guide pipe for containing the finally-purified water condensed by said condensing unit.

2. The water purified according to claim 1, wherein said oxidation-reduction unit has a casing provided with:

an anodic inlet port for introducing the tap water into said casing;

an anodic outlet port for discharging the pre-purified water from said casing; and a cathodic outlet port for discharging the heavy metals and organic materials from said casing.

3. The water purifier according to claim 1, wherein said oxidation-reduction unit comprises:

an anode for separating oxygen from said tap water and promoting oxidation of the tap water, said anode being formed by coating ruthenium oxide (RuO) on titanium oxide (TiO);

a cathode for promoting reduction of said tap water thereby separating the heavy metals and organic materials from the tap water, said cathode being formed of iridium; and a perforated partition for passing ionized or atomized materials while intercepting molecular materials, said partition being arranged between said anode and cathode.

4. The water purifier according to claim 1, wherein said condensing unit comprises:

a cool water generator generating cooling water for cooling the vapor flowing in said vapor guide pipe thereby condensing the vapor;

a pump for generating pumping force to forcibly circulate the cooling water generated by the cooling water generator; and a condensing pipe surrounding said vapor guide pipe and guiding said cooling water in order to condense the vapor flowing in the vapor guide pipe.

5. The water purifier according to claim 1, wherein said second water tank is provided with an ultraviolet lamp for sterilizing the purified water contained in the second water tank.

6. The water purifier according to claim 1, wherein said distillation means comprises:

a heater for heating said pre-purified water supplied from said first water tank in order to vaporize the prepurified water while distilling off the various harmful materials of the water; and a funnel pan for discharging the various harmful materials from said distillation means.

* * * * *